United States Patent
Blume et al.

(10) Patent No.: US 12,527,242 B2
(45) Date of Patent: Jan. 20, 2026

(54) TRACK FOLLOWING SYSTEM

(71) Applicant: AGCO International GmbH, Neuhausen (CH)

(72) Inventors: Tobias Blume, Wolfenbüttel (DE); Lasse Neumann, Wolfenbüttel (DE)

(73) Assignee: AGCO International GmbH, Neuhausen (CH)

( * ) Notice: Subject to any disclaimer, the term of this patent is extended or adjusted under 35 U.S.C. 154(b) by 12 days.

(21) Appl. No.: 18/776,545

(22) Filed: Jul. 18, 2024

(65) Prior Publication Data
US 2025/0113756 A1 Apr. 10, 2025

(30) Foreign Application Priority Data
Oct. 10, 2023 (GB) .................................... 2315527

(51) Int. Cl.
*A01B 69/00* (2006.01)
(52) U.S. Cl.
CPC .......... *A01B 69/004* (2013.01); *A01B 69/001* (2013.01)
(58) Field of Classification Search
None
See application file for complete search history.

(56) References Cited

U.S. PATENT DOCUMENTS

| | | | |
|---|---|---|---|
| 11,606,895 B2 * | 3/2023 | Nieto Lara | G06V 20/588 |
| 2022/0000005 A1 * | 1/2022 | Nieto Lara | A01B 69/008 |

FOREIGN PATENT DOCUMENTS

| | | | | |
|---|---|---|---|---|
| CN | 111238394 B | * | 7/2021 | ............ G01N 21/64 |
| CN | 113163708 A | * | 7/2021 | ............ A01B 69/008 |
| CN | 115334867 A | * | 11/2022 | ............ A01D 69/00 |
| DE | 102018220410 A1 | * | 5/2020 | ............ A01B 69/001 |
| TH | 2201006639 A | * | 1/2025 | |

OTHER PUBLICATIONS

UK Intellectual Property Office, Search Report for related UK Application No. GB2315527.8, dated Mar. 27, 2024, 3 pages.

* cited by examiner

*Primary Examiner* — Shelley Chen

(57) ABSTRACT

A track following system is provided for an agricultural machine, in which tracks are identified in captured images and the visibility of the identified tracks at ground level is assessed. If the tracks are invisible at ground level, a track position is determined by converting from a track position corresponding to the position of the tracks visible in the captured image to a corrected track position based on the height difference between ground level and crop level. This gives accurate track locating.

12 Claims, 5 Drawing Sheets

TRACK FOLLOWING SYSTEM

CROSS-REFERENCE TO RELATED APPLICATIONS

This application claims the benefit of the filing date of United Kingdom Patent Application No. 2315527.8, filed Oct. 10, 2023, the disclosure of which is hereby incorporated herein in its entirety by this reference.

FIELD

The present disclosure relates generally to track following systems, used by agricultural machinery when performing ground processing functions.

BACKGROUND

Tracks or tramlines are formed by the wheels or tracks of agricultural vehicles when performing agricultural field operations (harvesting, sewing, spraying etc.). The tracks damage the crop, so it is desirable avoid forming new tracks each time a crop treatment is carried out. Thus, it is known to follow existing tracks, to limit the damage to the crop.

It is also known to provide driver assistance to follow the tracks, for example using automated steering. This required the locations of the existing tracks to be identified. This can be done by camera image analysis.

However, inaccuracies arise when the tracks cannot be fully imaged, in particular when the bottoms of the tracks are not visible because the crops have grown to such a height that they obscure the view of the tracks. In such a case, the track paths need to be identified from the gaps at crop level, but this introduces inaccuracy.

BRIEF SUMMARY

According to examples in accordance with a first aspect of the invention, there is provided a track following system for an agricultural machine, comprising:
  a camera for capturing images of a field at least in front of the machine; and
  a processor for processing the captured images, wherein the processor is configured to:
  identify tracks in the captured images;
  determine visibility of the identified tracks at ground level; and
  if the tracks are invisible at ground level, determine a track position by converting from a track position corresponding to the position of the tracks visible in the captured image to a corrected track position based on the height difference between ground level and crop level.

This system enables tracks through crops to be followed, for example by an automatic steering system. Tracks may be identified in captured images either as tracks along the ground or as gaps in an otherwise uniform field of a crop, wherein the crop level is the level at the top of the crop in the field. For example, tracks at ground level may be hidden by crop when the crop has grown over a certain crop height. But a track may be visible at the crop height as a result of damaged or non-growing crop in a track.

The agricultural machine may be of any type such as a tractor, a harvester, a sprayer, a combine or an autonomous agricultural robot.

The processor is configured to determine invisibility of a track at ground level if the track is visible on crop level only.

In this case, the track location in the camera images does not correspond to the track location on the ground. Instead, there is an offset in the projection of the track image to the camera, caused by the height of the crop. Thus, when the tracks are identified as being invisible at ground level, an adjustment or conversion is carried out, to correct for the projection offset, based on the height of the crop. This crop height may be determined in various ways—for example it may simply be measured and input to the system, or else it may be determined by the system from image analysis, in various different possible ways.

Once the (true) track position has been determined, it can be used in various ways. One use case is that the machine is automatically steered to follow the same path (wherein the tracks were formed by the wheels of the machine during a previous ground operation), to limit the damage to the crop. Thus, multiple crop treatment operations can be performed in sequence without causing additional crop damage, such as multiple spraying operations. Another use case is to determine one track position but follow a path which is offset relative to that track position, for example to ensure coverage of a field. The track following may be used in combination with navigation guidance.

If the tracks are visible at ground level, the processor is for example configured to determine a track position based on the position of the tracks visible in the captured images.

The processor is for example configured to:
identify a plane corresponding to crop level; and
determine a height difference between ground level and crop level based on the plane corresponding to crop level.

The height of the camera relative to ground level is known because the position of the camera is parameterized with position values (e. g. coordinates) stored in a memory being communicatively connected with the processor.

To determine the crop height, a 3D camera can be used to measure the distance between the crop and the camera. Based on the depth information of the 3D camera the crop height can be determined. However a 2D camera may be used with an additional sensor such as a distance sensor to determine the crop height.

Alternatively, 2D image to 3D image conversion may be carried out without requiring any additional sensing. Using such a 3D conversion, the height of the crop can be estimated.

The crop height may also or instead be derived from measurement from images at locations where a track is visible at ground level and the full height of the crop is visible adjacent to the track.

Another option is for the driver to be prompted to enter the height of the crop.

The processor is for example configured to determine the track position of a track which follows a curve in front of the machine. When a track follows a curve, so that the track does not extend forwardly from the machine, the ground will no longer be visible at a certain height of the crop to a forward facing camera, and this is when the approach of the machine still enables the track location to be identified accurately.

The processor may be configured to determine invisibility of a track at ground level if the track is hidden by crop growing in a field segment located close to an inside bend of the curve.

The system may further comprise a depth camera, thereby to form a 3D coordinate space for the captured images.

By combining camera images with depth information, a 3D coordinate space is derived for the surface in the field of view. This enables the plane at crop height to be derived (since that is the main feature visible in the images). The ground can be assumed to lie in a plane including the plane at the location of the machine. The camera is at a known fixed height relative to that plane. Where the bottoms of tracks are visible, the ground height can then also be obtained from image analysis.

Another aspect of the invention provides a self-steering system for an agricultural machine, comprising:
a track following system as defined above; and
an automatic steering system for steering the agricultural machine to follow the track position determined by the track following system.

Another aspect of the invention provides a method of following a track, comprising: receiving images of a field at least in front of an agricultural machine;
identifying tracks in the captured images;
determining visibility of tracks at ground level; and
if the tracks are invisible at ground level, determine a track position by converting from a track position corresponding to the position of the tracks visible in the captured image to a corrected track position based on the height difference between ground level and crop level.

If the tracks are visible at ground level, the method for example comprises determining a track position based on the position of the tracks visible in the captured images.

The method may comprise determining the height difference between ground level and crop level by identifying a plane corresponding to the crop level.

Another aspect of the invention provides a computer program product comprising computer program code means which is adapted, when said program is run on a computer, to implement the method as defined above.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
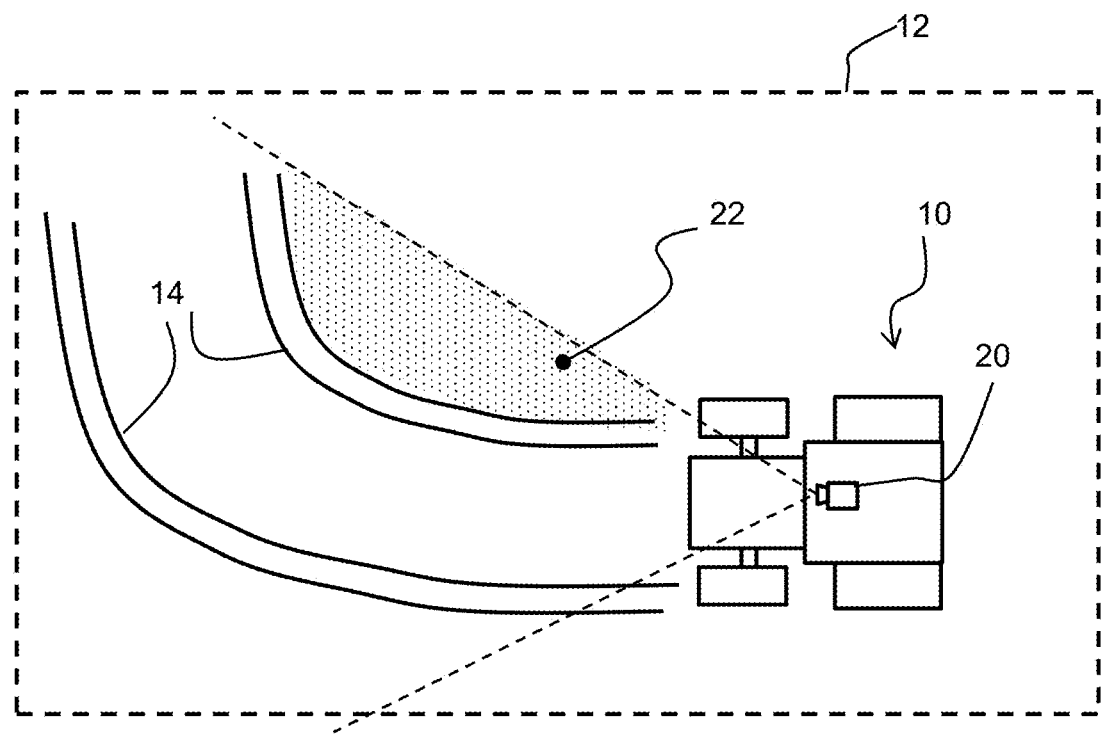
FIG. 1 shows an agricultural machine in a field.

Several aspects of the invention will be described with reference to the Figures.

It should be understood that the detailed description and specific examples, while indicating exemplary embodiments of the apparatus, systems and methods, are intended for purposes of illustration only and are not intended to limit the scope of any aspects of the invention. It should be understood that the Figures are merely schematic and are not drawn to scale. It should also be understood that the same reference numerals are used throughout the Figures to indicate the same or similar parts.

This disclosure relates to a track following system for an agricultural machine, in which tracks are identified in captured images and the visibility of the identified tracks at ground level is assessed. If the tracks are invisible at ground level, a track position is determined by converting from a track position corresponding to the position of the tracks visible in the captured image to a corrected track position based on the height difference between ground level and crop level. This gives accurate track locating.

FIG. 1 shows an agricultural machine 10, such as a tractor, in a field 12. The machine is following tracks 14 made in the field due to a previous field operation. The field 12 has a crop which has grown to a crop height, and the tops of the crop define a plane which will be termed crop level. The machine 10 sits at ground level (because of course it compresses the crop to form the tracks). The machine has a camera 20 for capturing a field of view in front (and partially to the sides) of the machine.

The camera images are processed to enable the location of the tracks to be identified, and this information may be used to perform automated steering (or provide steering assistance) of the machine to follow the existing tracks, and thereby avoid further damage to the crop.

In a most simple example, the camera 20 is a single 2D camera. However, there may be multiple cameras, and there may be 3D cameras, or a separate depth or range sensor which has a field of view registered to a 2D camera.

When the tracks extend straight ahead of the machine, the bottom of the tracks (at ground level) will be visible. This makes identification of the track location simple. In particular, the camera is at a fixed position and orientation on the machine 10, so the field of view is a known area of field in front of the machine 10, and the location of the tracks 14 in real world coordinates is correlated with the location in the image, i.e. each pixel has a one-to-one mapping to a ground location in front of the machine 10 at a known position relative to the machine. Thus, recognition of the tracks 14 in the images enables the real world track location to be determined.

If the machine is on a slope, the camera will similarly be sloped, so that the field of view still corresponds to the same area in front of the machine and in the direct path of movement of the machine 10. Thus, for track following, there is no need to make any compensation for the slope of the land. This is based on the assumption that the ground plane in front of the machine 10 has a slope which matches a slope at the machine 10. Thus, the closeness of the tracks 14 to the machine means that errors arising from the changes in ground slope can be tolerated. If 3D imaging is used, these slope changes can be imaged.

Camera information may also be used. For example, a non-flat ground surface may be determined from the profile of the crop level (visible in the camera images), based on an assumption that the crops have same height. This is explained further below.

When the tracks are not straight ahead, the bottom of the tracks 14 can become obscured by the crop. FIG. 1 shows two tracks 14 which follow a curve in front of the machine 10. In such a case, a track 14 will be invisible at ground level because the bottom of the track 14 is hidden by crop growing in a field segment located close to an inside bend of the curve. One such field segment is shown shaded as area 22.

Figure 2:
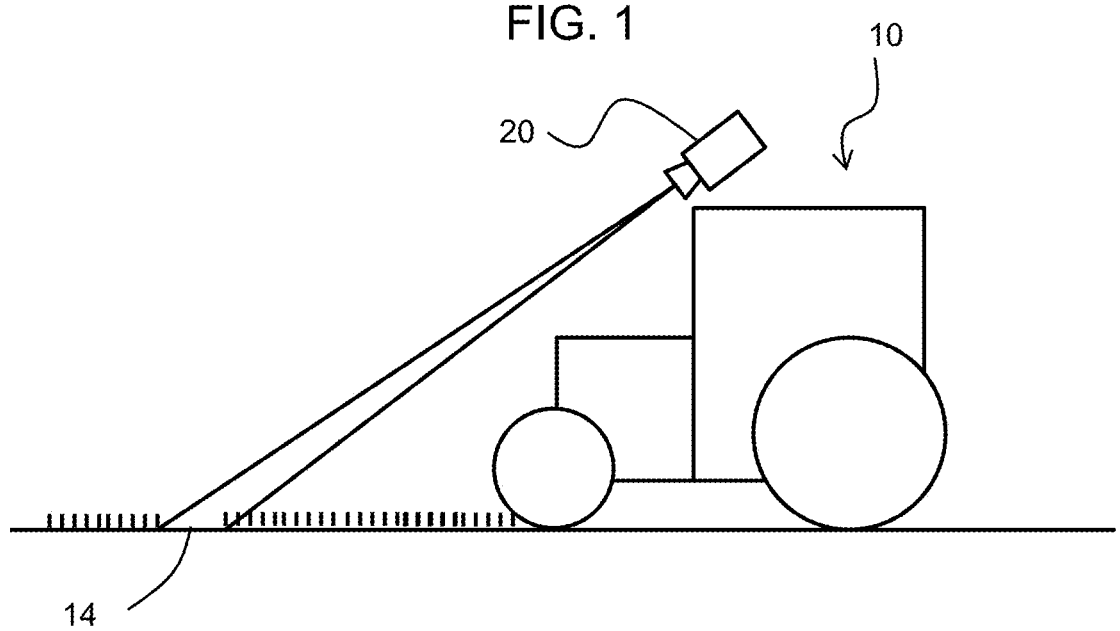
FIG. 2 schematically shows the machine with a track in front extending across the direction faced by the machine and shows a low crop.

FIG. 2 schematically shows the machine 10 with a track 14 in front extending across the direction faced by the machine 10 (the track is closer to the machine than a real scenario, to make the figure clearer). FIG. 2 shows a low crop so that the bottom of the track 14 is still unobstructed in the field of view of the camera 20.

Figure 3:
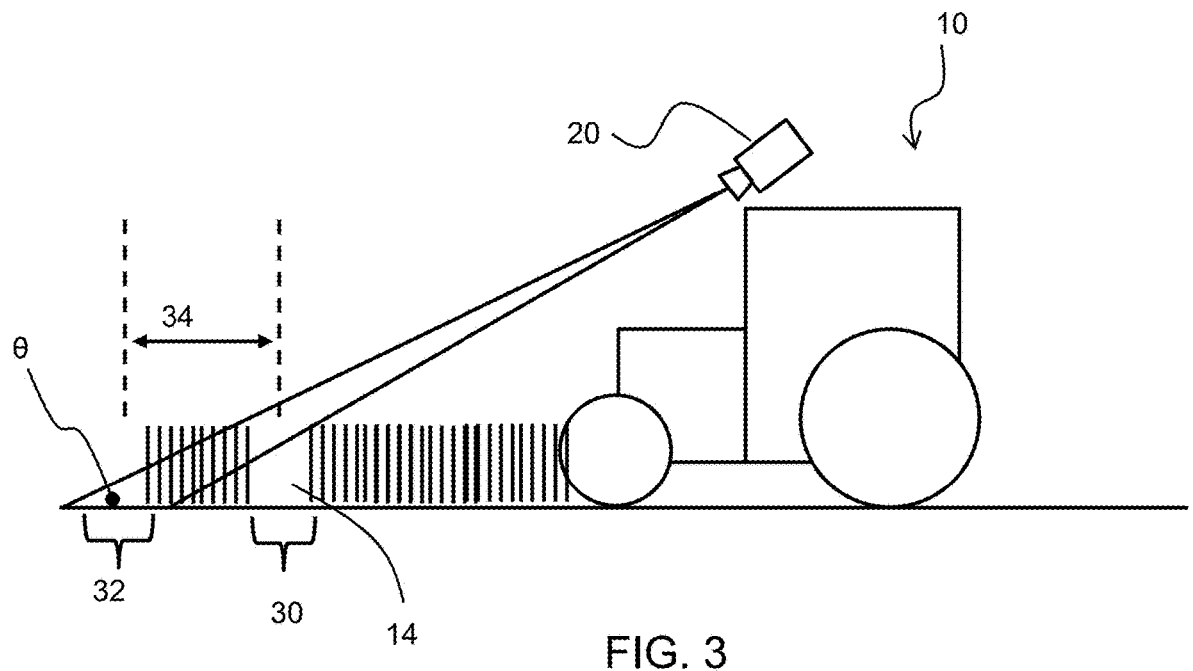
FIG. 3 schematically shows the machine with a high crop.

FIG. 3 schematically shows the machine 10 with the track 14 in front extending across the direction faced by the machine 10 but with a high crop so that the bottom of the track 14 is not visible. The track position at ground level is shown as 30. However, if the track 14 as viewed in the camera image is assumed to be at ground level, it will be determined to be at location 32 because the gap at crop level is in a region of the captured image which is associated (by the on-to-one mapping mentioned above) with the ground location 32. Thus, there is a projection offset 34 caused by the height of the crop.

The track following system is based on distinguishing between tracks that are visible at ground level and tracks which are only visible at crop level so that the offset in the projection of the track image to the camera 20, caused by the height of the crop, can be corrected when the tracks 14 are only visible at crop level. A track 14 is considered invisible at ground level if the track is visible on crop level only, so that there is no ground level reference that can be used to correctly identify the location of the track 14.

When the tracks 14 are identified as being invisible at ground level, an adjustment or conversion is carried out, to correct for the projection offset 34. This correction needs to take account of the height of the crop since the crop height determines the projection offset. The correction may be a trigonometric calculation. In particular, each location (pixel) in the captured image is associated with an angle $\theta$ to the camera. The offset 34 is obtained from $\tan \theta = h/D\_offset$ where h is the crop height and D_offset is the offset required towards the camera. The crop height h may be determined in various ways as discussed below.

Figure 4:
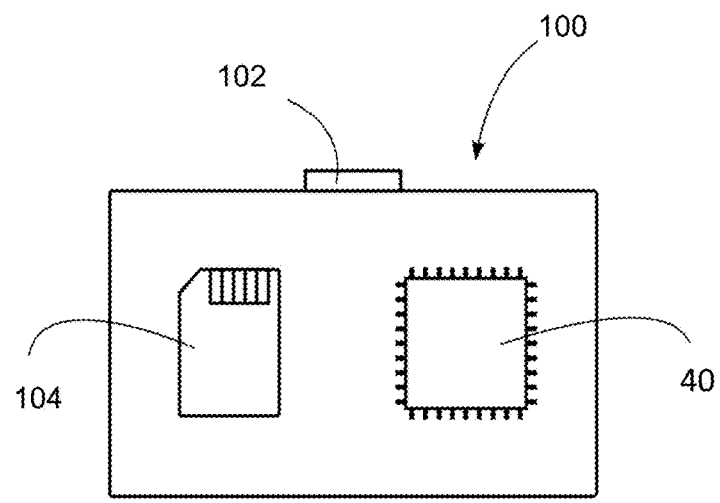
FIG. 4 shows a control unit to form part of the agricultural machine for implementing a track following method.

The image processing is performed by a processor which is part of an overall control unit. FIG. 4 shows a control unit 100 comprising an I/O interface 102, a processor 40 and a memory 104. The control unit 100 is part of the agricultural machine 10. The control unit 100 may receive and send signals or data via the I/O interface 102. The I/O interface 102 may be a wireless I/O interface or a connector and may be connected with the camera 20 and a steering system of the machine 10. The processor 40 may store the data or signals received by the control unit 100 in the memory 104. The memory 104 may contain additional data or executable computer program products, for example in terms of a computer-implemented method, that may be retrieved, processed or executed by the processor 40. Data or signals resulting from the processing of data or signals or from the execution of a computer program product may be stored to the memory 104 or sent to the I/O interface 102 by the processor 40.

Figure 5:
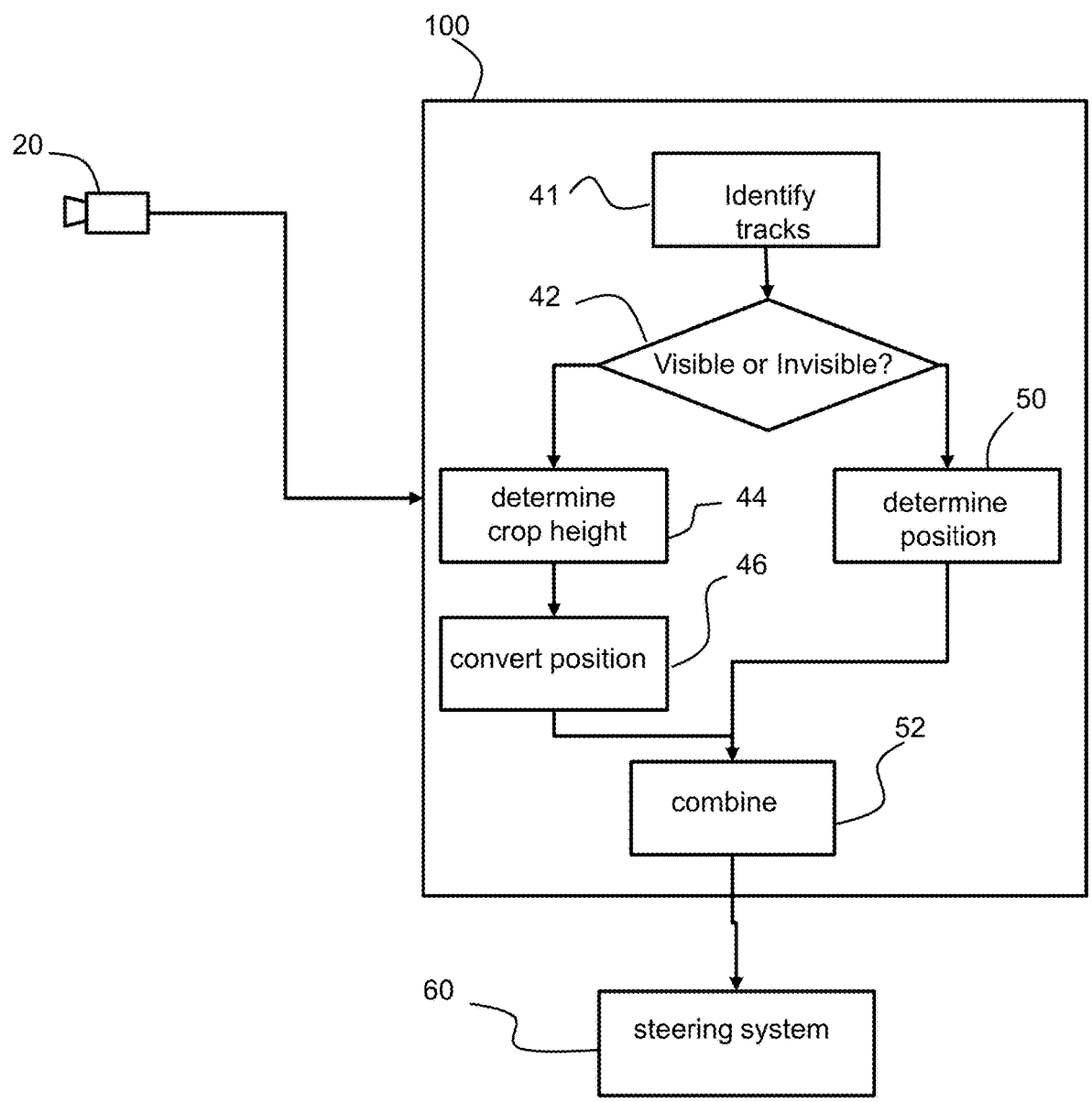
FIG. 5 shows a track following system for an agricultural machine.

FIG. 5 shows a track following system for an agricultural machine 10, comprising the camera 20 and the control unit 100 for processing the captured images.

FIG. 5 shows also a flow chart of a method for following a track. The method may be at least partly a computer-implemented method stored as a computer program product in the memory 104 of the control unit 100. The control unit 100 is configured to carry out the method. Computer-implemented parts of the method may be executed by the processor 40 of the control unit 100. Non-computer-implemented parts of the method may be executed manually or by other components of the system. The method is described by way of example of several steps without any restriction in respect of these steps. Thus, the number or the order of steps may be adapted, for example single steps may be excluded and/or added and executed earlier or later than described.

From the captured images, the processor 40 identifies tracks in the captured images in step 41. This involves use of image processing software for feature recognition, and in particular an algorithm that can identify tracks as having different image characteristics to upright crops.

In step 42, the processor 40 determines the visibility of the identified tracks at ground level. Thus, it determines if they are visible or invisible, wherein a track is visible at ground level if any ground surface is identified.

If the tracks are invisible at ground level, a crop height is determined in step 44, as discussed below. A track position is then obtained by converting from a track position corresponding to the position of the tracks visible in the captured image to a corrected track position based on the height difference between ground level and crop level. This conversion is shown as step 46. The camera position is known, including its height to the ground (i.e., the height to the bottom of the machine wheels) and the direction faced by the field of view relative to the machine 10. Thus, every point in the image corresponds to a known ground location. However, image features not at ground level need to be corrected to derive their corresponding ground level locations, as explained above.

If the ground in front of the machine 10 is assumed to be planar and in the same plane as the surface on which machine is standing (so with the same slope), the machine can be steered to follow the track regardless of the machine orientation, because the track location is known relative to the machine.

If the tracks are visible at ground level, a track position is obtained in step 50 based on the position of the tracks visible in the captured images.

The track locations from visible and invisible ground level analysis are combined in step 52. This track location information may then be used by an automated steering system 60 of the machine 10. The machine 10 may for example be automatically steered to follow the same path (wherein the tracks were previously formed by the wheels of the machine), to limit the damage to the crop. It is also possible to identify one track position but follow a path which is offset relative to that track position, for example to ensure coverage of a field. For example, the local coordinates of the identified track are converted to GPS coordinates and are provided to a track guidance system. Another option is to send only an error signal relative to a path to the track guidance system (implementing a nudging approach).

Instead of automated steering, the system may instead provide steering assistance but still allow the user to have control of the steering.

The conversion from the crop level to the ground level, so that the track location along the ground can be determined, for example involves shifting the detected track location at crop level down by a number of pixels corresponding to the crop height.

The conversion from crop level to ground level is basically a projection problem of converting image pixels (of a 2D image) into 3D points that can be used for steering guidance. The 2D image sensor does not provide any depth information, so that the track can be detected in the image, but it is not known how far away it is from the sensor. The detected points are located along a ray, and the 3D location of those points can be derived from the 2D pixel location using the assumption that the point is at ground level. The plant height above the ground is an error that makes this assumption false (as also does uneven terrain).

The required correction, in terms of the pixel adjustment needed, depends on various parameters. For example, the position of the detected points within the 2D image may be used as part of a function which determines the required pixel shift to ground level. For example, the steeper the view of the terrain in front, the smaller the required pixel shift to reach ground level. The orientation (e.g., radius of curvature and direction) of the detected path at the detected points may also be used to derive the required pixel compensation.

Thus, a downward pixel shift may be determined as a function of the position in the image and the orientation of a detected point along a track.

It is noted that there are alternatives to the pixel shifting approach described above. For example, for each detected point, a plane height at which the intersection takes place may be set (e.g., ground level or crop level), so that for each point a correct assumption (as explained above) is made about the height at which the intersection with the ray is made. This gives a set of 3D points including different heights (rather than shifted to ground level as in the example above). The xy coordinates of the detected track path then correspond to the track path at ground level.

Figure 6:
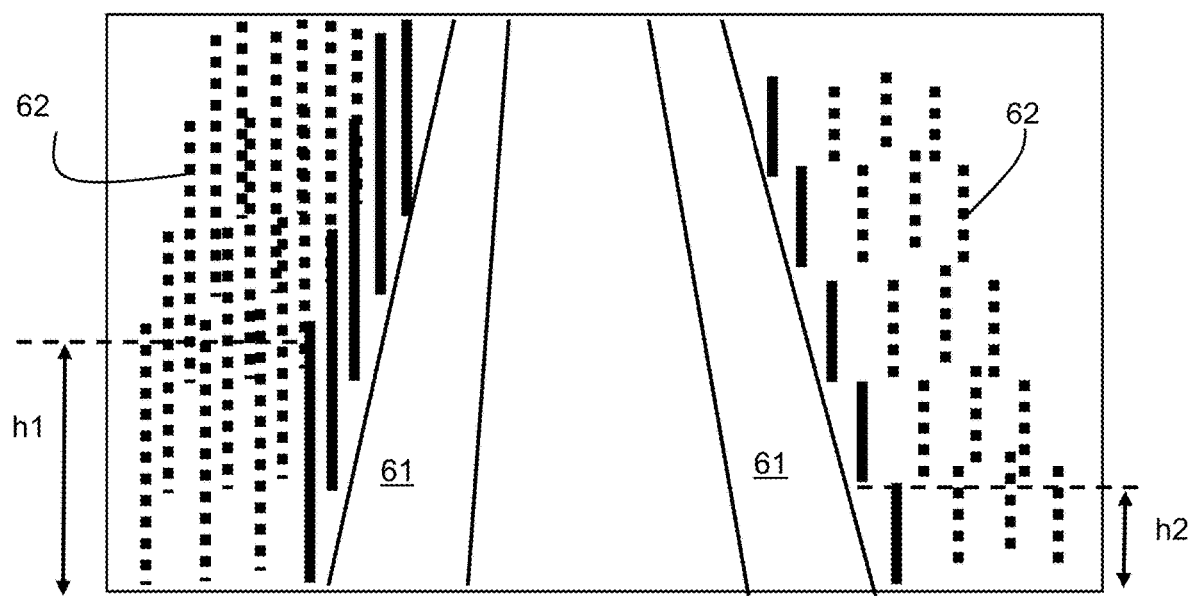
FIG. 6 shows a captured image, showing two tracks which are visible at ground level.

FIG. 6 shows a captured image, showing two tracks 61 which are visible at ground level. The crop 62 is shown to the left of the left track and to the right of the right track. The height of the crop is for example derived from images where a crop is visible down to ground level, so adjacent the track. Such crops are shown in solid lines. For example, heights h1 and h2 are each a certain number of image pixels (a fraction of the full image height) which translate to real world dimensions.

This provides one way to measure crop height, and it can be performed whenever a crop is visible to ground level.

Even when no ground level is visible, the crop height can still be determined from image analysis. For example, using a depth camera or other 3D sensor correlated with the 2D image sensor, the 3D location of a crop level plane can be determined. The ground level plane has a known location because the depth camera is at a fixed position relative to the machine 10 and hence relative to the (local) ground position. Thus, the crop height can be determined by determining the crop level plane and its position relative to an assumed ground level plane.

Instead of a 3D camera, 2D image to 3D image conversion may be carried out. Using such a 3D conversion, the height of the crop can again be estimated (see for example: Kuo et al.: "2D-to-3D conversion for single-view image based on camera projection model and dark channel model").

Another option is for a user to measure the crop height manually and input it to the system.

Figure 7:
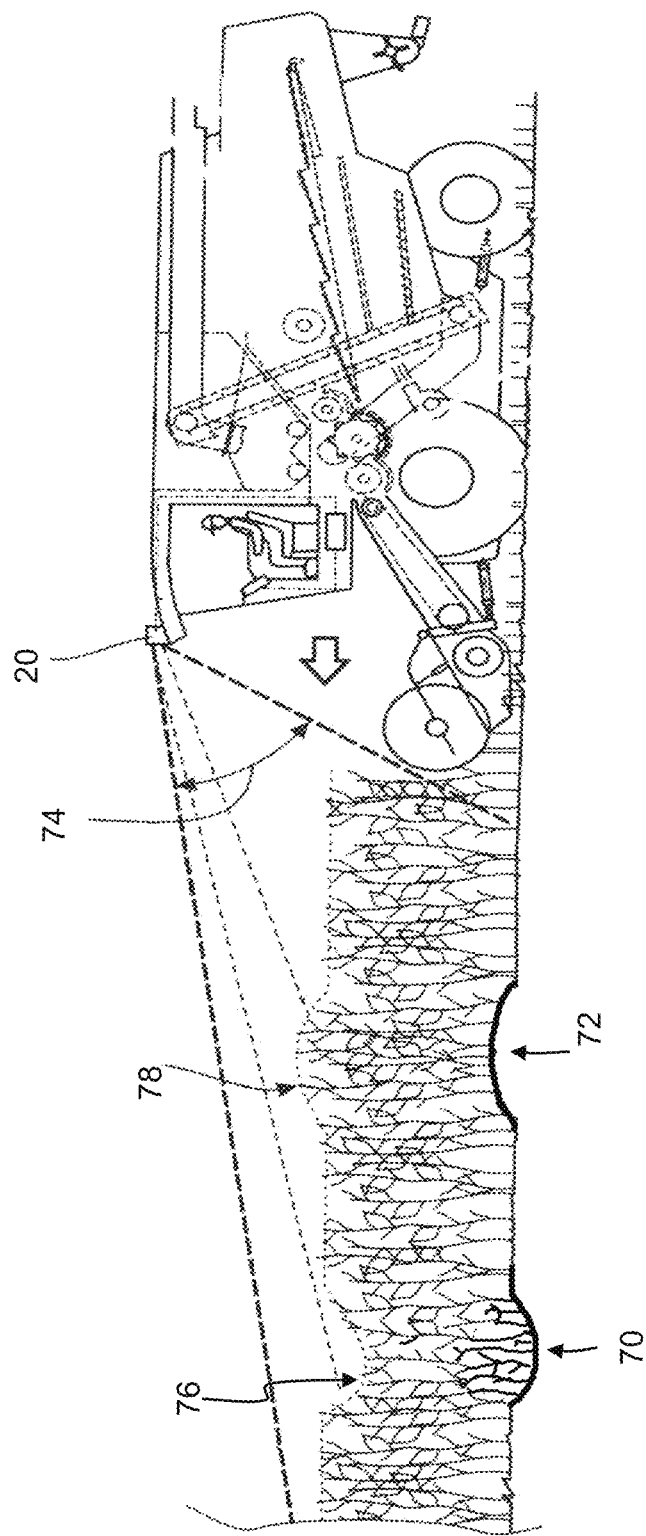
FIG. 7 shows how a dip and a mound may be visible in the field of view at crop level.

The examples above assume a flat ground surface in the field of view of the camera (and one which is at least locally an extension to the surface on which the machine is located). However, the ground surface may also not be flat. FIG. 7 shows how a dip 70 and a mound 72 may be visible in the field of view 74 at crop level as dip 76 and raised portion 78 when there is a uniform crop height. The imaging of the crop level surface (using a 3D camera or using 3D reconstruction) may enable such local ground topology to be identified so that the track location can be determined with greater accuracy.

Variations to the disclosed aspects of the invention can be understood and effected by those skilled in the art in practicing the claimed aspects of the invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

All references cited herein are incorporated herein in their entireties. If there is a conflict between definitions herein and in an incorporated reference, the definition herein shall control.

LISTING OF DRAWING ELEMENTS 10 machine
12 field
14 track
20 camera
22 area
32 location
34 projection offset
34 offset
40 processor
60 automated steering system
61 track
62 crop
70 dip
72 mound
74 view
76 dip
78 raised portion
100 control unit
102 interface
104 memory

What is claimed is:

1. A track following system for an agricultural machine, comprising:
    a camera for capturing images of a field at least in front of the machine; and
    a processor for processing the captured images, wherein the processor is configured to:
        identify tracks in the captured images;
        determine visibility of the identified tracks at ground level; and
        if the tracks are invisible at ground level, determine a track position by converting from a track position corresponding to the position of the tracks visible in the captured image to a corrected track position based on the height difference between ground level and crop level.

2. A track following system according to claim 1, wherein, if the tracks are visible at ground level, the processor is configured to determine a track position based on the position of the tracks visible in the captured images.

3. A track following system according to claim 1, wherein the processor is configured to determine invisibility of a track at ground level if the track is visible on crop level only.

4. A track following system according to claim 1, wherein the processor is configured to:
   identify a plane corresponding to crop level; and
   determine the height difference between ground level and crop level based on the plane corresponding to crop level.

5. A track following system according to claim 1, wherein the processor is configured to determine the track position of a track which follows a curve in front of the machine.

6. A track following system according to claim 5, wherein the processor is configured to determine invisibility of a track at ground level if the track is hidden by crop growing in a field segment located close to an inside bend of the curve.

7. A track following system according to claim 1, further comprising a depth camera, thereby to form a 3D coordinate space for the captured images.

8. A self-steering system for an agricultural machine, comprising:
   a track following system as claimed in claim 1; and
   an automatic steering system for steering the agricultural machine to follow the track position determined by the track following system.

9. A method of following a track, comprising:
   receiving images of a field at least in front of an agricultural machine;
   identifying tracks in the captured images;
   determining visibility of tracks at ground level; and
   if the tracks are invisible at ground level, determine a track position by converting from a track position corresponding to the position of the tracks visible in the captured image to a corrected track position based on the height difference between ground level and crop level.

10. A method according to claim 9, comprising, if the tracks are visible at ground level, determining a track position based on the position of the tracks visible in the captured images.

11. The method according to claim 9, comprising determining the height difference between ground level and crop level by identifying a plane corresponding to the crop level.

12. A computer program comprising computer program code means which is adapted, when said program is run on a computer, to implement the method of claim 9.

* * * * *